US012562027B1

(12) United States Patent
Pascal et al.

(10) Patent No.: US 12,562,027 B1
(45) **Date of Patent: *Feb. 24, 2026**

(54) CASH SLOT MACHINE AUGMENTED WITH SECONDARY CURRENCY

(71) Applicant: Playstudios US, LLC, Las Vegas, NV (US)

(72) Inventors: Andrew Pascal, Las Vegas, NV (US); Paul Mathews, Las Vegas, NV (US); Monty Kerr, Austin, TX (US)

(73) Assignee: Playstudios US, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,136

(22) Filed: Oct. 9, 2023

Related U.S. Application Data

(63) Continuation of application No. 17/241,104, filed on Apr. 27, 2021, now Pat. No. 11,783,671, which is a continuation of application No. 16/231,922, filed on Dec. 24, 2018, now Pat. No. 10,991,204, which is a continuation of application No. 15/131,008, filed on Apr. 17, 2016, now Pat. No. 10,163,304, which is a continuation of application No. 14/210,030, filed on Mar. 13, 2014, now Pat. No. 10,163,303.

(60) Provisional application No. 61/780,874, filed on Mar. 13, 2013.

(51) Int. Cl.
*G07F 17/32* (2006.01)
*G07F 17/34* (2006.01)

(52) U.S. Cl.
CPC ...... *G07F 17/3255* (2013.01); *G07F 17/3246* (2013.01); *G07F 17/34* (2013.01)

(58) Field of Classification Search
None
See application file for complete search history.

(56) References Cited

U.S. PATENT DOCUMENTS

2006/0258422 A1* 11/2006 Walker .................... G07F 17/32 463/7
2008/0214287 A1* 9/2008 Lutnick .................. A63F 13/35 463/25
2011/0034252 A1* 2/2011 Morrison ............ G07F 17/3223 463/43

* cited by examiner

*Primary Examiner* — Omkar A Deodhar
(74) *Attorney, Agent, or Firm* — Muskin and Farmer LLC

(57) ABSTRACT

A method, apparatus, and computer readable storage to implement an augmented game system. A player can play an online game and accumulate loyalty points without have to pay cash. The player can enter a physical casino and play an electronic gaming machine which can retrieve the player's information from the online game including the number of loyalty points the player has and any other incentives or game add-ons the player would be entitled to. The player would then play a physical game on the electronic game normally (by depositing cash and playing) but the game play would be augmented by virtue of the player having the loyalty points or other incentives or add-ons. For example, the game can be augmented by giving the player a better paytable.

20 Claims, 7 Drawing Sheets

CASH SLOT MACHINE AUGMENTED WITH SECONDARY CURRENCY

CROSS REFERENCES TO RELATED APPLICATIONS

This application claims benefit to U.S. provisional application 61/780,874, filed on Mar. 13, 2013, which is incorporated by reference herein in its entirety. This application is related to U.S. application Ser. No. 14/144,581, which is incorporated by reference herein in its entirety. This application is also related to U.S. nonprovisional application Ser. No. 13/472,454, which is incorporated by reference herein in its entirety. U.S. application Ser. No. 15/131,008 is incorporated by reference herein in its entirety. U.S. application Ser. No. 14/210,030 is also incorporated by reference herein in its entirety.

BACKGROUND OF THE INVENTION

Field of the Invention

The present general inventive concept is directed to a method, apparatus, and computer readable storage medium directed to a game that allows players to use a secondary currency or loyalty points earned in a casual game played online to augment play on an electronic gaming machine that is played in a physical casino for real money.

Description of the Related Art

Throughout the history of casinos, slot machines have been played in the same general manner. A player deposits cash (or coins, etc.) into a slot machine, plays numerous games (which can win or lose) and then cashes out when the player is finished playing (unless the player has no funds remaining).

A recent phenomenon is that of "casual play" games online. These are games, such as online gambling games, where players play online for free (not for real money). Players enjoy playing online because they get a somewhat "watered down" casino experience right from home. They are called "casual games" because typically the online games are not played for real money (and thus the play is "casual" because players do not have to worry that they will lose money).

Until now, there has been no merger or synergy of these two experiences. What is needed is a mechanism to conjoin these two experiences so that players who play casual games can use their casual play time to improve their play experience in real life casinos.

SUMMARY OF THE INVENTION

It is an aspect of the present invention to enable players to augment their gaming experience on a physical slot machine with loyalty points earned from an online game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
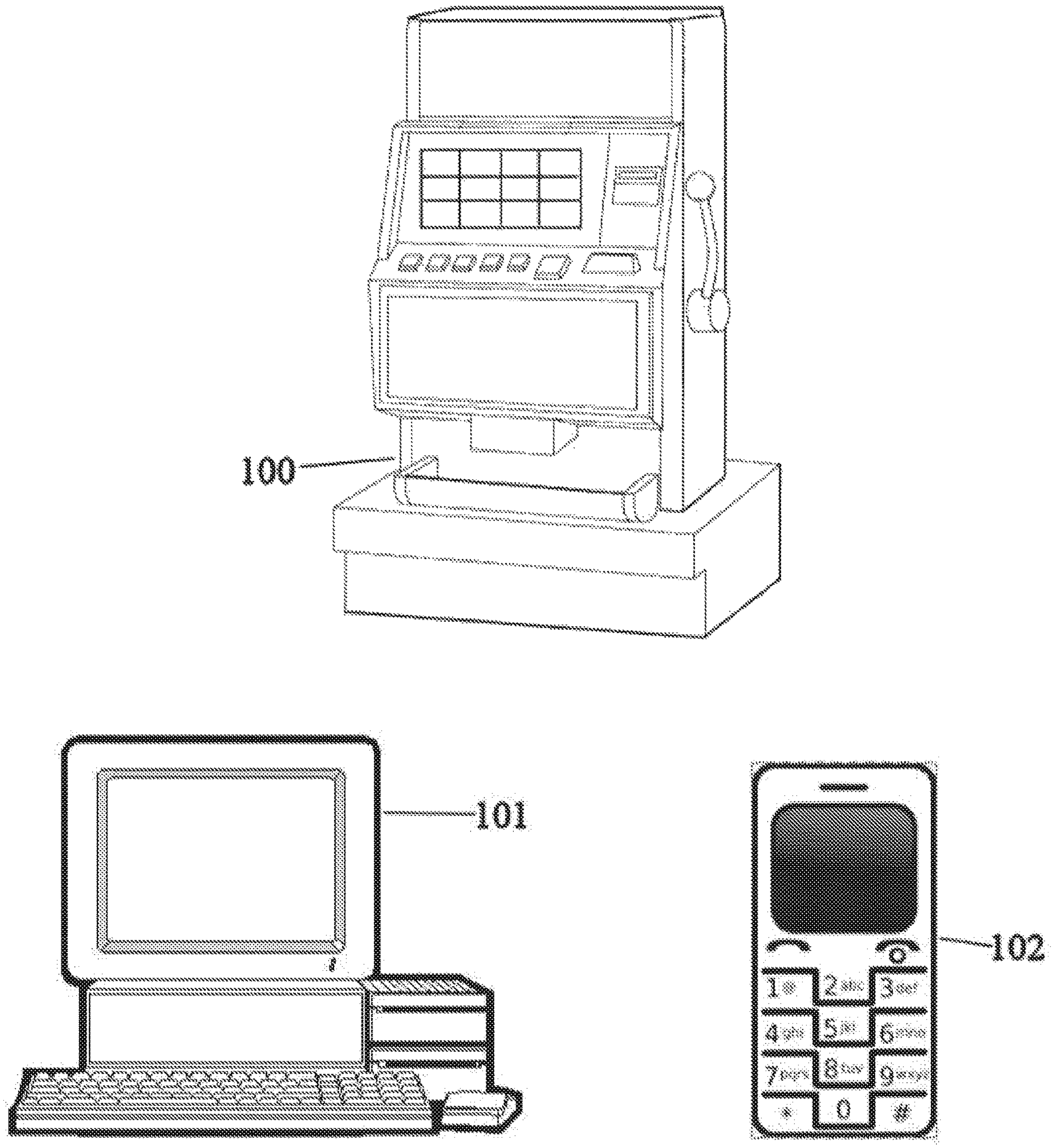
FIG. 1 is a drawing illustrating numerous apparatuses that can play the game described herein, according to an embodiment.

Reference will now be made in detail to the presently preferred embodiments of the invention, examples of which are illustrated in the accompanying drawings, wherein like reference numerals refer to like elements throughout.

The present inventive concept relates to combining experiences on physical electronic gaming devices found in casinos (e.g., slot machines) with games that can be played online. Online games can include games played on a social networking site such as FACEBOOK (including what is described in U.S. Pat. No. 7,669,123 which is incorporated by reference herein in its entirety), MYSPACE, or any other site which maintains a database of users and provides an interface for interaction.

Players can earn a loyalty points (also referred to herein as secondary currency or virtual points) by playing online (using a computer using the internet to play an online game such as one on FACEBOOK). Loyalty points typically have no cash value. The online game can be an online casino or any other game. The secondary currency/loyalty points can be earned as described herein. These loyalty points can then be used to augment real life play on an electronic gaming machine at a casino (e.g., slot machine, video poker machine, etc.) The final result is the merging of online play and real life play so that players can benefit from a synergy of the two experiences. Loyalty points can also be redeemed for tangible goods. For example, a list of tangible items (e.g., free room at a particular hotel, show tickets for a particular show, deck of playing cards, etc.) can all be displayed alongside a cost in loyalty points, and the player can choose which item the player wishes to receive upon which the respective number of loyalty points will be deducted from the player's account (assuming the player has the required number of loyalty points) and the player will be delivered the item (electronically such as via an email/text or physically).

FIG. 1 is a drawing illustrating numerous apparatuses that can play the slot machine game described herein, according to an embodiment.

The game described herein can be played on an electronic gaming machine 100 that can found in brick and mortar casinos or other venues such as internet cafes, etc. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the electronic gaming machine 100 from a central remote server.

The game described herein can also be played on a computer 101 such as a personal computer, laptop, etc. The game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social network site itself. "Casual play" is where the game can be played not for real money but for credits which typically have no cash value, but can have other benefits to the player.

The game described herein can also be played on a cell phone 102 or any other type of portable device, such as a tablet computer, etc. The portable device can implement any of the paradigms described herein with respect to the computer 101 (e.g., online casino, social networking site, etc.)

Figure 2:
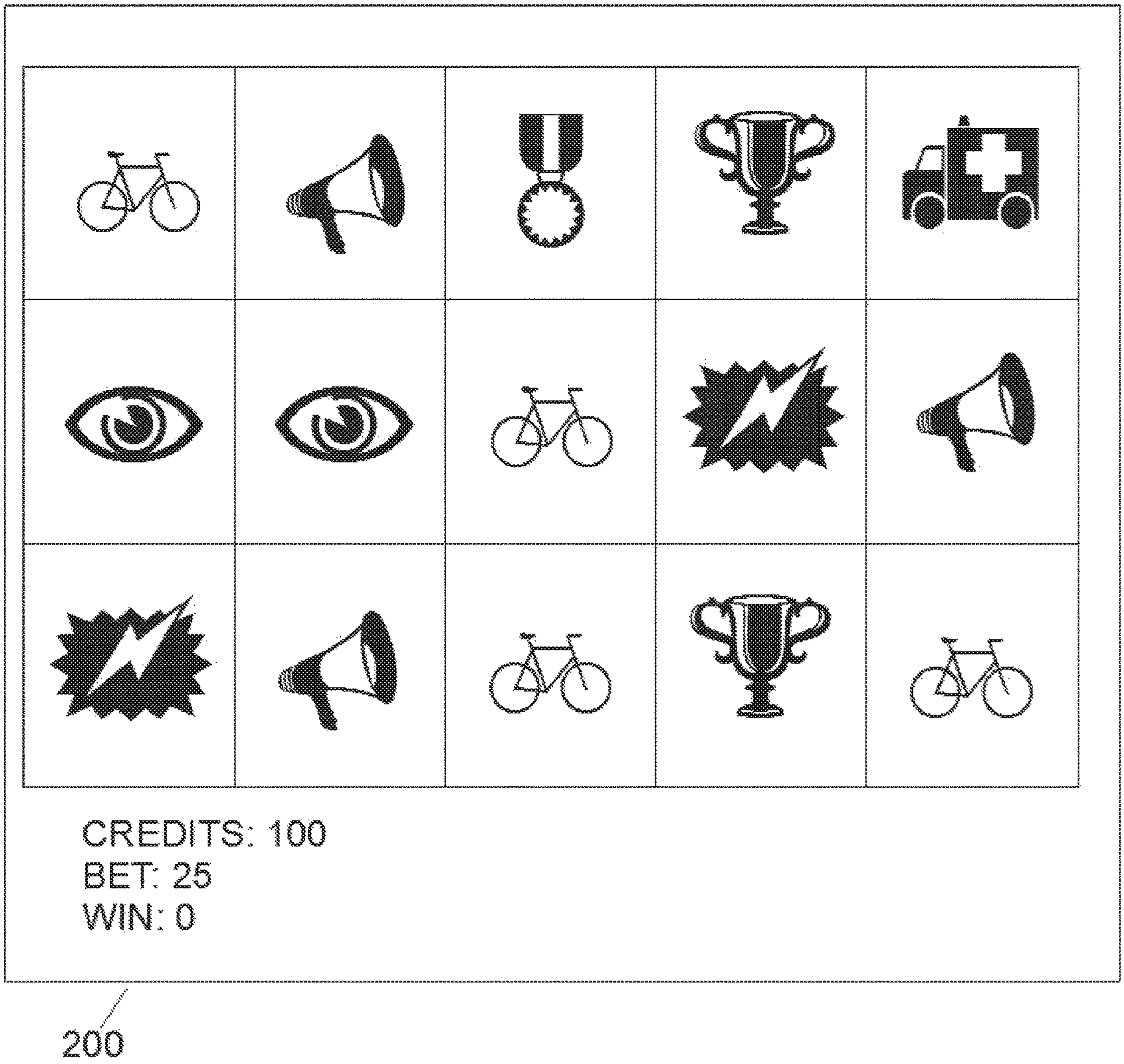
FIG. 2 is a drawing of a slot machine game that can be played online or on a physical electronic gaming machine, according to an embodiment.

FIG. 2 is a drawing of a slot machine game that can be played online or on a physical electronic gaming machine, according to an embodiment.

The slot machine game can be any type of slot machine game, such as three rule, five rule, etc. For an example of a slot machine game, see U.S. Pat. No. 8,251,798 which is incorporated by reference herein in its entirety.

A player can earn loyalty points in numerous ways. See U.S. application Ser. No. 13/472,454, 61/747,822, and 13/767,257 (all three applications of which are incorporated by reference herein in their entireties) which describe ways a player can earn loyalty points. Loyalty points are typically earned from playing games online that are part of the entire system. Players typically would not have to pay cash in order to earn loyalty points.

"Cash credits" refers to credits the player may have on an electronic gaming device which can be cashed out instantly for a cashless voucher which is redeemable for cash at a ticket redemption machine or casino cashier cage. For example, a player deposits a $100 bill into a bill validator in an electronic gaming machine, he has $100 cash credits. Assuming the player plays the electronic gaming machine and wins $50, the player's credit meter reflects that he has $150 cash credits in which the player can immediately cash out at any time and redeem for cash.

Non cash value credits (also referred to as non cash value chips) are credits which cannot be directly converted into cash. Non cash value credits can be used to play a slot machine game (or any other electronic wagering game). Non cash value credits can be purchased using cash or earned by completing tasks. Some non cash value credits may be given away for free to players who meet certain conditions.

Thus, a player can enter a casino and play an electronic gaming machine with cash credits (by depositing cash, depositing a cashless voucher which has a particular value of cash credits, or by using any other cash deposit mechanism such as an electronic deposit of funds, etc.) The player can augment his play of the electronic gaming machine by using loyalty points the player has earned online. Of course, there must be some communication between the player's loyalty points that he has earned with the electronic gaming machine (the source of the loyalty points and the operator of the electronic gaming machine would typically have to be operating in conjunction with each other). The source of the earned loyalty points can be outside the casino, such as an online casino server unrelated (or possibility affiliated with) the casino the player is playing in.

Figure 3:
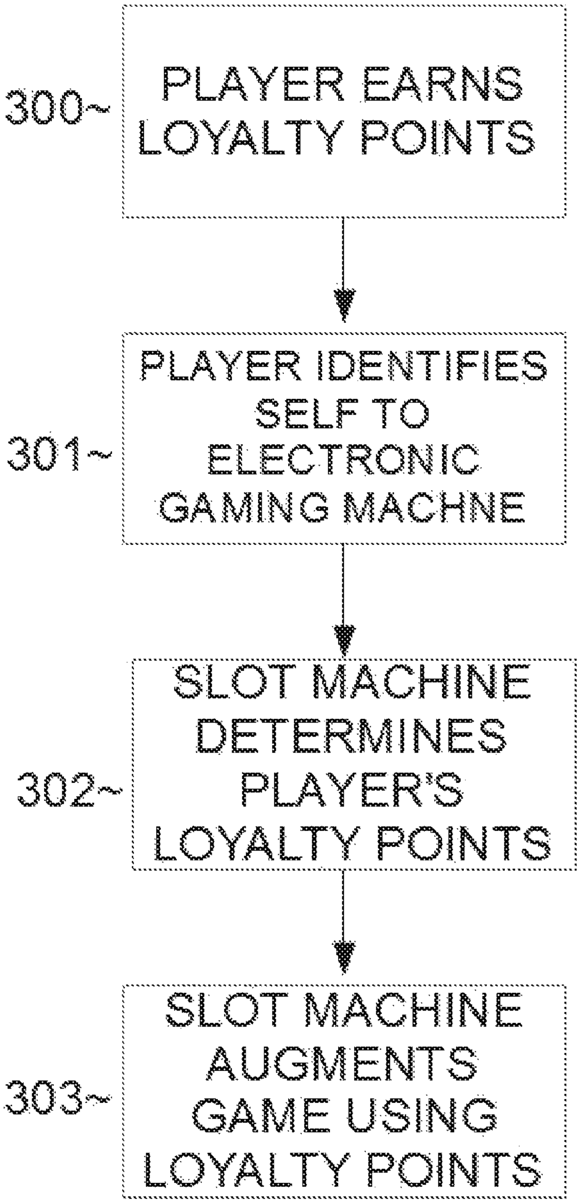
FIG. 3 is a flowchart illustrating an exemplary method of augmenting play on an electronic gaming machine with loyalty points, according to an embodiment.

FIG. 3 is a flowchart illustrating an exemplary method of augmenting play on an electronic gaming machine with loyalty points, according to an embodiment.

The method can begin in operation 300, wherein the player earns loyalty points by playing online games (in an embodiment the player can also earn loyalty points by playing on an electronic gaming machine in a physical casino as well). This can be done as described in application Ser. No. 13/472,454, 61/747,822, and 13/767,257 (which are all incorporated by reference in their entireties). Typically, each player has their own account that they use to play online, either on a game served on its own web site or a game served via a social networking web site (e.g., FACEBOOK). If the player does not already have an account, they would create one (as known in the art), or log into their account and play online. As the player plays, the player would earn loyalty points which are accumulated in the player's account. One way of earning loyalty points is based on handle, in other words for every 100 non-cash value credits bet on a game, the player would earn 1 loyalty point (or any other ratio can be used).

The player's loyalty points can be optionally exchanged by the player for valuable goods or services. For example, in one embodiment, the player can exchange a predetermined amount of loyalty points for an augmented bonus round on a particular game (e.g., "Lucky Larry's Slots) on an electronic gaming machine (e.g., a particular model of electronic gaming machine that can play numerous games) in a physical casino (physical game).

After the player played the online games, the player can visit a physical casino. In operation 301, the player would identify himself/herself (operation 301) to the electronic gaming machine in the casino (via using a player's comp card or by typing in the player's account information on a screen on the electronic gaming machine. Players at casinos can sign of for a player's loyalty account (also referred to in the industry as player's account or player's club account) in which they receive a "comp card" or "loyalty card" with a magnetic strip which can be used to identify the player to the electronic gaming machine (and hence the casino) so that the casino can track the player's play. The casino maintains a player database of all of the players who have loyalty accounts and their respective information (their name, address, play information, comp points earned (which are a function of how much the player has wagered in total), etc.)

The player database in the casino can be in communication with an online game database which stores the accounts for the players who play an online game. So when a player inserts his comp card into a card reader on the electronic gaming machine, the casino's system can query the online game database to see if the player has an account with the online game. This can be done by using identifying information about the player such as his name, address, social security number, etc. In an embodiment, the player of the online game can link his online account to the casino loyalty account (by entering the account number etc.) or vice versa. Once the accounts are linked, the casino system would automatically recognize that a player who inserts his comp card into a card reader on an electronic gaming machine has an account with the online game and then can retrieve (operation 302) the number of loyalty points that player has from the online game (or other information such as particular packages the player may have purchased which can augment play on the physical game). These retrieved loyalty points (which may have been earned online) can then be used on the physical electronic gaming device at the casino to augment the game. Any loyalty points used (spent) in the physical casino will be deducted from the player's online account.

Another way the player can identify himself (operation 301) and the fact that he has an online game account is the player can also press a button on the electronic gaming machine to type in the player's login information (e.g., username and password) for the online game account so the online game account can be linked to the player loyalty account (so that in the future, whenever the player presents his/her loyalty card to an electronic gaming machine it would automatically be linked to the online game account and retrieve respective information from the online game account) and/or just for the upcoming gaming session information from the online game account can be used to augment play on the physical game just for this one session.

The player would also make a deposit of cash into the electronic gaming machine so that the player can play with the cash (or use a cashless voucher or electronic funding mechanism). The physical game has a credit meter which represents the amount of cash credits (cash available for wagering which can be cashed out at any time). So there are now two simultaneous quantities that can be used/affect gameplay—the cash credits and the loyalty points.

Once the electronic gaming machine is aware that the player has an online game account and has retrieved relevant information from the online game database (e.g., number of loyalty points the player has, any special incentives the player is entitled to, etc.), and the player has funded the electronic gaming machine with cash credits, the player can then play the physical game on the electronic gaming machine (operation 303) which is now augmented by virtue of the fact that the player has an online game account which has loyalty points and/or other associated incentives that can affect gameplay of the physical game. Typically, the affected gameplay would be an improvement over the standard (non-augmented) game and players would prefer to play the augmented game.

Ways in which a physical game can be augmented can include (but not limited to) the following:

i) the player return of the game can be improved by giving the player an improved reel mapping with more symbols to create payouts. For example, one or more wild symbols can be added to the reels that are not present on the regular game.

ii) the player return of the game can be improved by increasing payouts of winning combinations or adding winning combination(s) that were not winning combinations on the regular game.

iii) the game has a special bonus round that is only triggered upon augmentation (e.g., can be randomly triggered in the augmented game, or triggered based upon a combination of symbols that in the regular game does not trigger a bonus round), the bonus round being an additional "game within the game" that provides the player an opportunity to win additional prizes.

iv) when the game's bonus round is triggered, the augmented game gives the player an additional advantage in the bonus game. For example, when the bonus round award is over the bonus can be multiplied by an additional multiplier. For example, if the standard bonus round provides the player an award of $25.50, the augmented bonus round can multiply by the award by 2 (or other multiplier) resulting in the player winning $51 in the bonus round (instead of $25.50 if the player was playing the regular (unaugmented) game. In another embodiment, if a game's bonus round provides 10 free spins, then the augmented bonus round would increase the number of free spins (e.g., 15).

v) in addition to winning the standard credit payouts on the game paytable, the augmented game can award non-cash prizes as well. For example, on a standard paytable three cherries would pay 10 credits (for each credit bet), and an augmented paytable can also award a non-cash prize for three cherries (e.g., a free buffet). Table I below illustrates one example augmented paytable for a three reel game:

TABLE I

| Combination | standard payout | augmented payout |
|---|---|---|
| wild/wild/wild | 1000:1 | Alaska cruise for 2 |
| 7/7/7 | 100:1 | none |
| bell/bell/bell | 25:1 | none |
| bar/bar/bar | 10:1 | $25 coupon for Al's Steak |
| cherry/cherry/cherry | 5:1 | coupon for buffet |
| any 2 cherries | 2:1 | none |
| any 1 cherry | 1:1 | 1 additional loyalty point |

As can be seen by Table I, the player playing the standard, non-augmented game, does not get to receive the augmented payouts when the player gets those combinations on the physical slot game (but of course the player wins the standard payout of cash credits). If the player is playing the augmented game, then in addition to receiving the standard payout of cash credits the player also receives the augmented payout (a non-cash prize). The augmented payouts can also include a cash prize as well (e.g., bell/bell/bell can have an augmented award 5:1 additional cash credits (in addition to the standard 25:1 award for a total of 30:1 cash credits).

The non-cash prizes for the augmented payouts can be distributed through the player's online game account. When the player logs back into his/her online game account, the player would be presented with his or her prizes that the player has won during play of the augmented game. They can come in the form of coupons the player can print out, a virtual coupon the payer can send to his/her cell phone, a prize confirmation number and a phone number that the player can all with the prize confirmation number to arrange delivery of the prize.

The augmentation of the standard physical game (which do not offer the benefits of the augmented version) can be paid for by loyalty points. This can be done in numerous ways. For example, for every cent bet in the physical game, a loyalty point can be deducted from the player's online game account (e.g., on a $1 bet the player loses 100 loyalty points). Of course, any other ratio can be used as well. In another embodiment, an augmented play can be earned in the online game. For example, for completing a particular task in the online game, the player is awarded one augmented $2 spin (spins of a physical slot machine game can vary in the amount bet). Alternatively, the player can be awarded an augmented bonus round (e.g., by completing a task, receiving a particular outcome in the online game, reaching a particular level in the online game, etc.) When the player plays the physical game in the casino and triggers the bonus round then the player would be entitled to the augmented bonus round (e.g., with a bigger multiplier than the standard game, etc.)

In a further embodiment, the player can exchange loyalty points for augmented plays in the online game. For example, the player would be able to exchange 50 loyalty points for an augmented bonus round. Thus, upon exercising this option, when the player plays the physical game at the physical casino the electronic gaming machine would automatically detect that the player is entitled to the augmented bonus round. When the player triggers the bonus round, then the player would automatically be presented with the augmented bonus round. Once the player has received the augmented bonus round, then the next time the player triggers the bonus round the player would receive a standard (non-augmented) bonus round. Of course, the player could have purchased three (or any number) of augmented bonus rounds and then the player would be entitled to receive that many augmented bonus rounds before reverting back to the standard bonus round.

Bonus rounds can be triggered in numerous ways, such as a random determination (not related to symbols displayed on-screen), or by receiving a particular combination of symbols (e.g., three bonus symbols on the reels after a spin). Bonus games allow the player to win additional awards and typically provide the player a different game than the standard game. For example, a bonus round can present the player with fighting monsters, games involving manual dexterity, guessing games, etc. A bonus round can also simply be free spins of the regular game.

In a further embodiment, players can earn loyalty points not just by playing online but by playing in a physical casino itself (including the same casino wherein loyalty points can be used to augment games). A player can play a physical gaming machine on the casino floor and earn loyalty points (which is used to augment games as described herein) using any of the methods described herein. For example, each spin of an electronic slot machine (that the player pays cash to make each wager), 1 (or any number) of loyalty points are accumulated by the player (and are stored in the player's account (game account and/or casino account). Then the player (on this machine or on another slot machine at a later point time) can use those earned loyalty points to augment the game on the slot machine they are playing at. Or, if a player wins a particular award on a physical electronic gaming machine (e.g., hits a particular combination) in addition to a cash award the player can win loyalty points as well. Loyalty points can also be earned by reaching a particular level.

Players can also use electronic gaming machines to browse the internet and play the online game and earn the loyalty points (or any type of points) in any manner described herein. Players can also use a portable computing device on casino floor to play the online game and earn loyalty points which can then be used in the same casino they are already located in.

Loyalty points which can be used to augment a game can also be earned or awarded in numerous other ways as well. A casino host can award some loyalty points for a promotion or players can receive a voucher for loyalty points in the mail.

In order to effectuate the methods described herein, database systems of the physical casino where the electronic gaming machines are located would communicate with the database systems of the online game (in another embodiment, these databases can be the same database).

Games played online can also be augmented in the same manner that physical games can be augmented as described herein.

Figure 4:
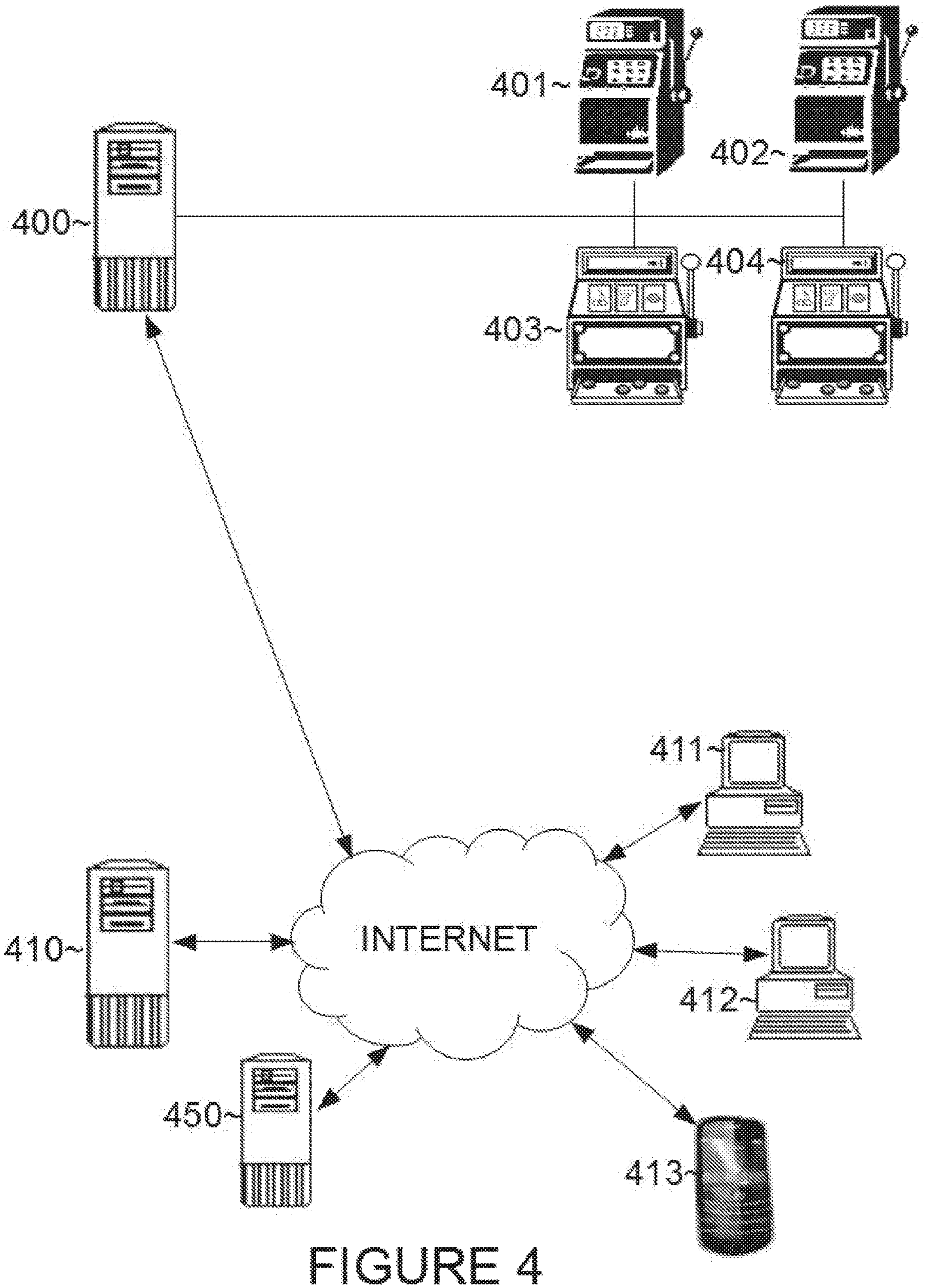
FIG. 4 is a block diagram illustrating components on a network that all can work together in order to effectuate the methods/systems described herein, according to an embodiment.

FIG. 4 is a block diagram illustrating components on a network that all can work together in order to effectuate the methods/systems described herein, according to an embodiment.

Casino database 400 is in communication with electronic gaming machines 401, 402, 403, 404 (and any other number of electronic gaming machines) on the floor of the casino. Each electronic gaming machine has a comp card (also referred to as loyalty card) reader which read each player's comp (or loyalty) card so the player's loyalty account can be located in the casino database 400 so the player's play can be tracked. Data tracked about the player can include wagers made, game results, amount deposited, amount cashed out, and any other data related to the player's game play. The player's data is stored indefinitely on the casino database 400 and a running total is maintained on the casino database 400 of each player's total number of comp points. Comp points can be awarded based on amount of bets placed, for example each $1 bet can equate to 1 comp point (or any other ratio). Comp points are accumulated in each player's account on the casino database 400 until the player redeems the comp points (comp points can be redeemed for room, food, beverage, etc.).

An online game database 410 stores player accounts for each player of an online game. The online game can be served over the Internet to players 411, 412, 413 (and any other number of players) by the same game database 410 or can be served by a game host 415. As each player plays the online game, they would log into their account on the online game database 410 which tracks their online play and also the amount of their loyalty points.

When a player is playing at an electronic gaming device at the casino (e.g., machine 401) and presents his comp card (or types in his online casino account number or other information which identifies the player's online account), the casino database 400 can retrieve the same player's information (e.g., the player's amount of loyalty points, any incentives the player should receive when playing, etc.) from the online game database 410. The casino database then transmits this information to the electronic gaming machine 401 the player is playing so that the game can be augmented accordingly. If the player wins any award that would be administered by the online game (e.g., a non-cash prize) then the award would be transmitted by the casino database 400 to the online game database 410 so that the next time the player logs into the online game the player can be presented with a confirmation of the award and also be presented with the ability to redeem it (have it emailed, delivered to the player, or picked up by the player).

Figure 5A:
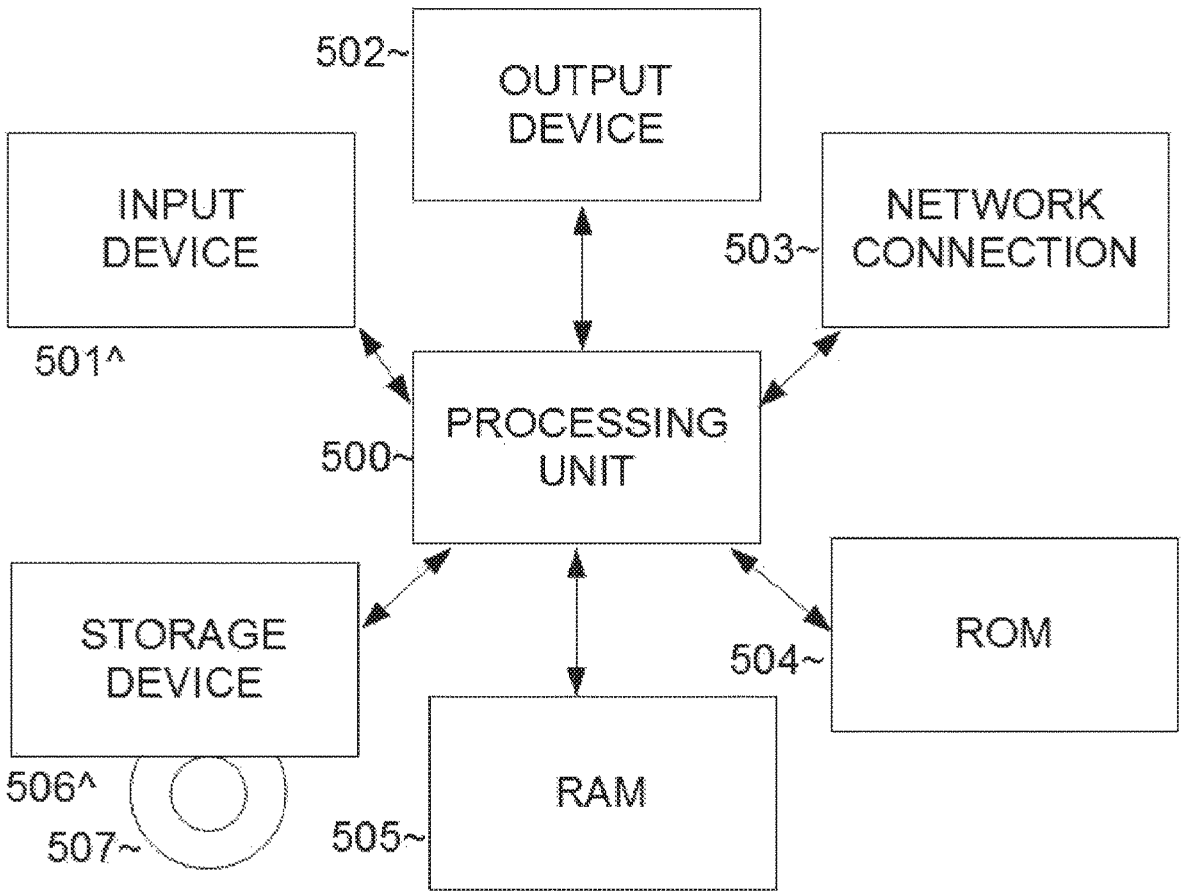
FIG. 5A is a block diagram illustrating exemplary hardware that can be used to implement the game described herein, according to an embodiment.

FIG. 5A is a block diagram illustrating exemplary hardware that can be used to implement the game described herein, according to an embodiment. The hardware in FIG. 5A can be used to implement a computer implementing the game described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site.

A processing unit 500 can be a microprocessor and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit 500 can implement any of the methods described herein. The processing unit 500 can also be connected to a network connection 503 which can connect to a computer communications network such as the Internet, Wi-Fi, LAN, WAN, etc. The processing unit 500 can also be connected to a ROM 504 and a RAM 505 as used in the art. The processing unit 500 can also be connected to a storage device 506 which can be nonvolatile storage device (e.g., BLU-RAY drive, CD-ROM drive, hard drive, EPROM, etc.) A computer readable medium 507 (e.g., BLU-RAY disc, CD-ROM, hard disc, etc.) can be read by the storage device 506 and can store programs and assets that can cause the processing unit 500 to perform any of the methods described herein. The ROM and RAM can also be loaded with instructions that can cause the processing unit 500 to perform any of the methods described herein.

Figure 5B:
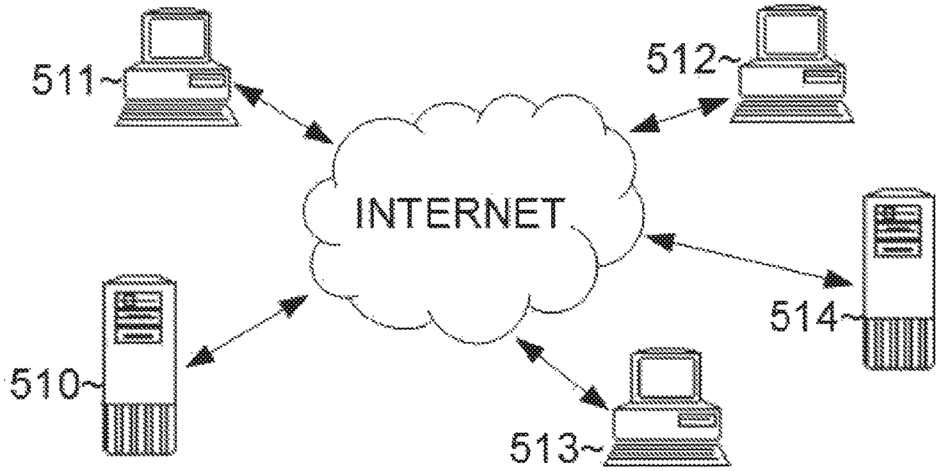
FIG. 5B is a network diagram showing a network structure for a social networking web site and players, according to an embodiment.

FIG. 5B is a network diagram showing a network structure for a social networking web site and players, according to an embodiment. The online game which awards and stores loyalty points can also be accomplished by the system illustrated in FIG. 5B.

A computer communications network (such as the Internet) can be used to connect a host server 510 which can host and serve a social networking site. Note that while FIG. 5B shows only one server as the host server 510, the host server 510 can encompass numerous servers all cooperating with each other (whether in the same physical location or not). The host server 510 communicates with players 511, 512, 513 through the Internet (or other computer communication network) and can implement any of the methods herein by executing computer code programmed accordingly. Game server 514 can also implement all games and methods described herein on the site by executing computer code programmed accordingly. The game server 514 is connected to the Internet and can communicate with all of the players 511, 512, 513 directly or indirectly through the social networking site hosted by the host server 510. The game server 514 can cooperate with the host server 510 so that the games run on the game server 514 can be integrated into the social networking site hosted by the host server 510. The game server can also be optional and all of the games can be also hosted on the host server 510, whereby the integration of the games served/hosted by the game server 514 will appear embedded in the social networking site hosted by the host server 510 such that players would typically not realize (or care) that multiple servers are cooperating in order to play games on the social networking site. All of the communications described herein can be effectuated using such a network configuration. Typically, the communications are effectuated on the social networking site itself, thus the players 511, 512, 513 should be logged into the social networking site in order to participate herein, although logging in is not required (e.g., communications can be transmitted using other methods, such as email, IRC chat, instant message, etc.) The host server 510 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

In a further embodiment, a player can play an electronic gaming machine (e.g., a physical slot machine) on a casino floor in a casual play mode. In casual play mode, a player bets (and can win) non-cash value credits (not exchangeable for cash) and can also earn loyalty points. The games the player plays in the casual play mode are the same as the games the electronic gaming machine plays in real money mode. Thus, if a player wants to play a particular slot machine game on an electronic gaming device on the casino floor (e.g., "Lucky Lizard Slots") but does not want to play it for real money (cash credits), the player can choose to play the Lucky Lizard Slot game in casual play mode (for non cash value credits). The same game ("Lucky Lizard Slots") may or may not be available for play online thus the player may only be able to play this game in a real casino floor at a real electronic gaming device. Playing a game in casual play mode is described in application Ser. No. 13/472,454 (which is incorporated by reference herein in its entirety). While non cash value credits may be purchased for cash and used to play wagering games in the casual mode, they cannot be redeemed for cash and cannot be redeemed for tangible goods/services. Note that the term "wagering games" still applies to playing in the casual mode, even though the "wager" made therein is in non-cash value credits and winnings are in non-cash value credits.

Figure 6:
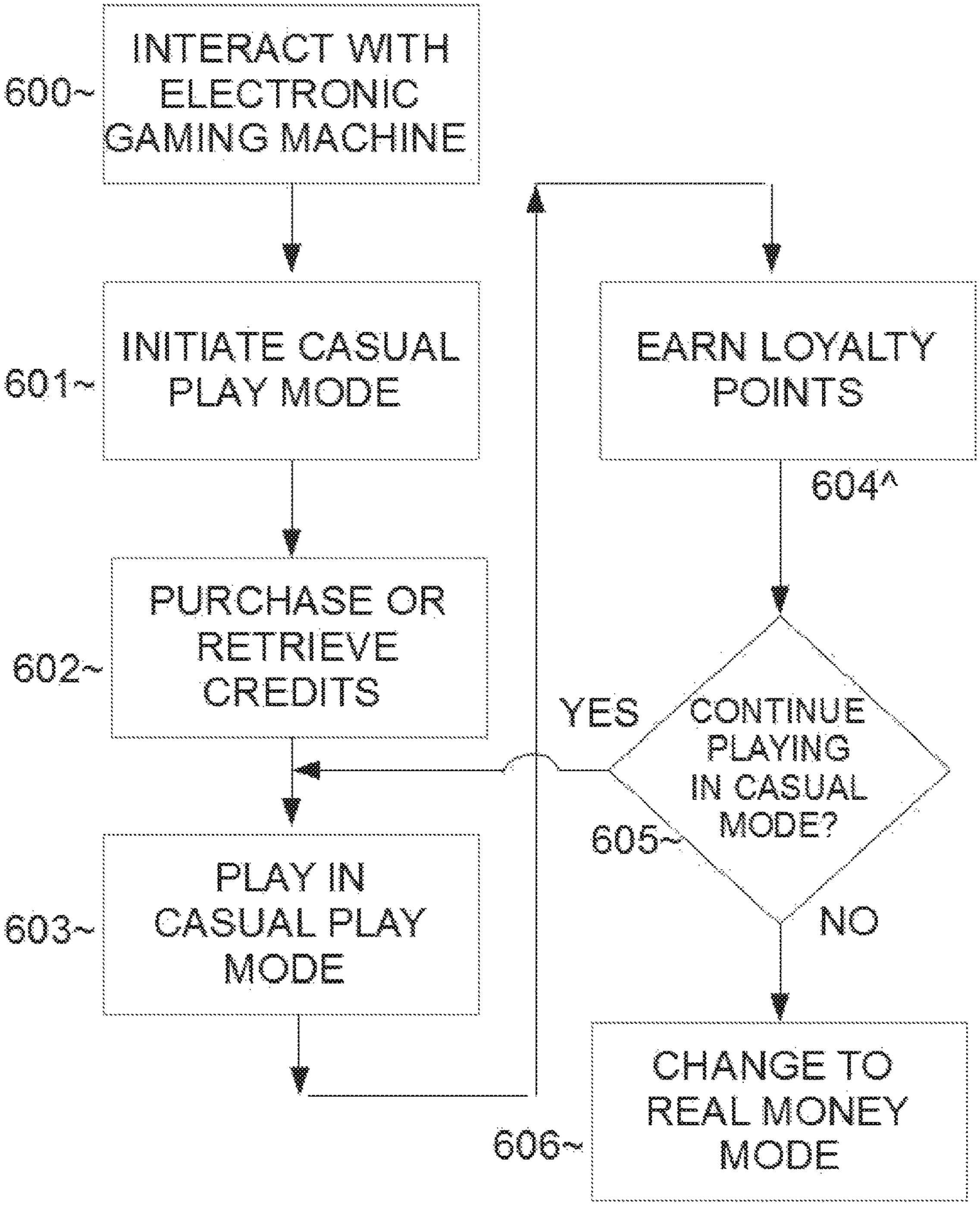
FIG. 6 is a flowchart illustrating an exemplary method of playing an electronic gaming machine on a physical casino floor in a casual play mode, according to an embodiment.

FIG. 6 is a flowchart illustrating an exemplary method of playing an electronic gaming machine on a physical casino floor in a casual play mode, according to an embodiment.

The method begins with operation 600, wherein a player interacts with an electronic gaming machine in a physical casino floor. The player can insert his/her player's card, insert cash, touch the screen, etc. to indicate to the machine that it should switch to casual play mode.

From operation 600, the method proceeds to operation 601, wherein the player initiates the casual play mode. This can be done by pressing buttons (physical or virtual) on the electronic gaming machine (e.g., slot machine) or using a graphical user interface (GUI) on the output display on the electronic gaming device to touch (using a touch screen) a particular button. For example, a button on the machine can say "casual play mode" which, when pressed, initiates that casual play mode.

From operation 601, the method proceeds to operation 602, wherein the player purchases non-cash value credits. These can be purchased by inserting cash into a bill acceptor on the electronic gaming machine. The electronic game machine, because it is in casual play mode (instead of real money mode) would convert any inserted cash into non-cash value credits (instead of cash credits if the electronic game machine was in real money mode). Note that the rate of exchange per cash dollar is different for cash credits and non-cash value credits. For example, inserting a $1 bill into the bill validator in the real money mode would credit the player 1 cash credit worth $1. Inserting a $1 bill into the bill validator in the casual play mode could credit the player 100 non-cash value credits (or any other amount). Alternatively, the player can fund the electronic gaming machine (EGM) from the player's account on the online game database (which hosts online games for casual play). The account can be identified by the player's comp card (also referred to loyalty card) which could be inserted by the player into the EGM's card reader in operation 600. Any non-cash value credits the player has in his/her account can be transferred to the EGM so that the player can use them to play the EGM in the casual play mode (also referred to as casual mode).

From operation 602, the method proceeds to operation 603, wherein the player plays in the casual play mode. The player bets non-cash value chips (also referred to as non cash value credits) to play the games (e.g., slot machine games, video poker, blackjack, etc.) and wins only non-cash value chips. Each wager that the player makes, the wager amount (for example, each spin of a slot machine can cost 10 non cash value credits) is deducted from the player's credit meter (which shows how many non-cash value credits the player currently has). The non-cash value credits (non-cash value chips) cannot be converted into cash or cash credits. In the casual play mode, the player does not bet cash credits and does not win cash credits. If the player runs out of non cash value credits (i.e. the credit meter shows 0 non cash value credits) then the player would not be able to continue playing in the casual play mode and the player would have to purchase more non cash value credits in order to continue playing.

From operation 603, the method proceeds to operation 604, wherein the player earns loyalty points (also referred to as virtual points) from the play in operation 603. Loyalty points can be earned in any of the ways that "loyalty points" are earned in application Ser. No. 13/472,454 (which is incorporated by reference herein in its entirety). For example, a loyalty point can be earned for each non-cash value credit wagered on a game (in the casual play mode, non-cash value credits cannot be wagered in the real money mode). Thus, for example, if the player is wagering 50 non-cash value credits per spin of a slot game, then the player can earn (and accumulate in the player's account) 50 loyalty points for each of those spins. Thus, loyalty points are earned in proportion to the "gaming action" offered by the player (e.g., total amount of non-cash value credits wagered).

From operation 603, the method proceeds to operation 605, which determines whether the player wishes to continue playing in the casual mode. If the player wishes to switch modes (into the real money mode) the player can press a button (real or virtual) on the EGM (wherein the method would proceed to operation 606).

If in operation 605, the player continues to play in the casual mode (by pressing a "spin" button or other button to continue playing), the method proceeds to operation 603 wherein the player continues playing for non-cash value credits and continues to earn loyalty points. All earned loyalty points are accumulated in the player's account on the gaming server (and/or the player's account with the casino where the EGM is located) so that the player can redeem the loyalty points at a later time (e.g., exchange them for tangible goods and services).

If in operation 605, the player changes the mode of the EGM to the real money mode, then the method proceeds to operation 606 wherein the EGM changes to real money mode. The mode the EGM is in (casual play or real money) should be prominently displayed on the machine's display so that the player knows which mode the machine is in. In real money mode, the EGM accepts cash deposits which are converted to cash credits. Cash credits are used to play the game (which are directly redeemable for cash) and cash credits can be won if the player wins the game. From operation 606, the method can proceed to operation 701.

Note that the player can play the same games in the casual play mode and the real money mode. This can provide players the opportunity to test games out in the casual play mode before playing them for real money.

Thus, as illustrated in FIG. 6, a physical slot machine (EGM) can be played as a "fremium" game. In other words, it can be played by the player for free or the player can purchase non-cash value chips to play. However, the non-cash value credits are not exchangeable for real money (e.g., cash, cash credits) and can only be played. Typically, the player would not be required to spend a lot in cash to purchase non-cash value credits. For example, the player can purchase 10,000 non-cash value credits for $5 in cash and thus the 10,000 non-cash value credits can (on the average) be played by the player for a good amount of time (e.g., an hour on average) before losing it all. In an embodiment, non-cash value credits can be given to the player for free instead of the player having to purchase non-cash value credits with real money. In an embodiment, the player can be given a certain amount (e.g., 1,000) non cash value credits for free to play with but after the player has depleted his/her non cash value credits then the player would have to purchase more non cash value credits to continue playing in the casual mode.

Note that a player can redeem his/her loyalty points directly at the EGM. The player can select (by pressing a button, etc.) to go to a redemption screen wherein the player can select a tangible product (e.g., free drink, meal at a particular restaurant, free night stay at a particular hotel such as the hotel the player is currently playing at, etc.) and exchange the player's loyalty points for that tangible product right at the EGM. The player can then be delivered the tangible product in numerous ways (e.g., an email is sent with a redemption code which can be presented to a casino employee to receive the tangible product, a cashless voucher is printed at the machine which the player would take to a casino employee to exchange for the tangible product, etc.)

In a further embodiment, a player can play in real money mode yet earn loyalty points for his/her play.

Figure 7:
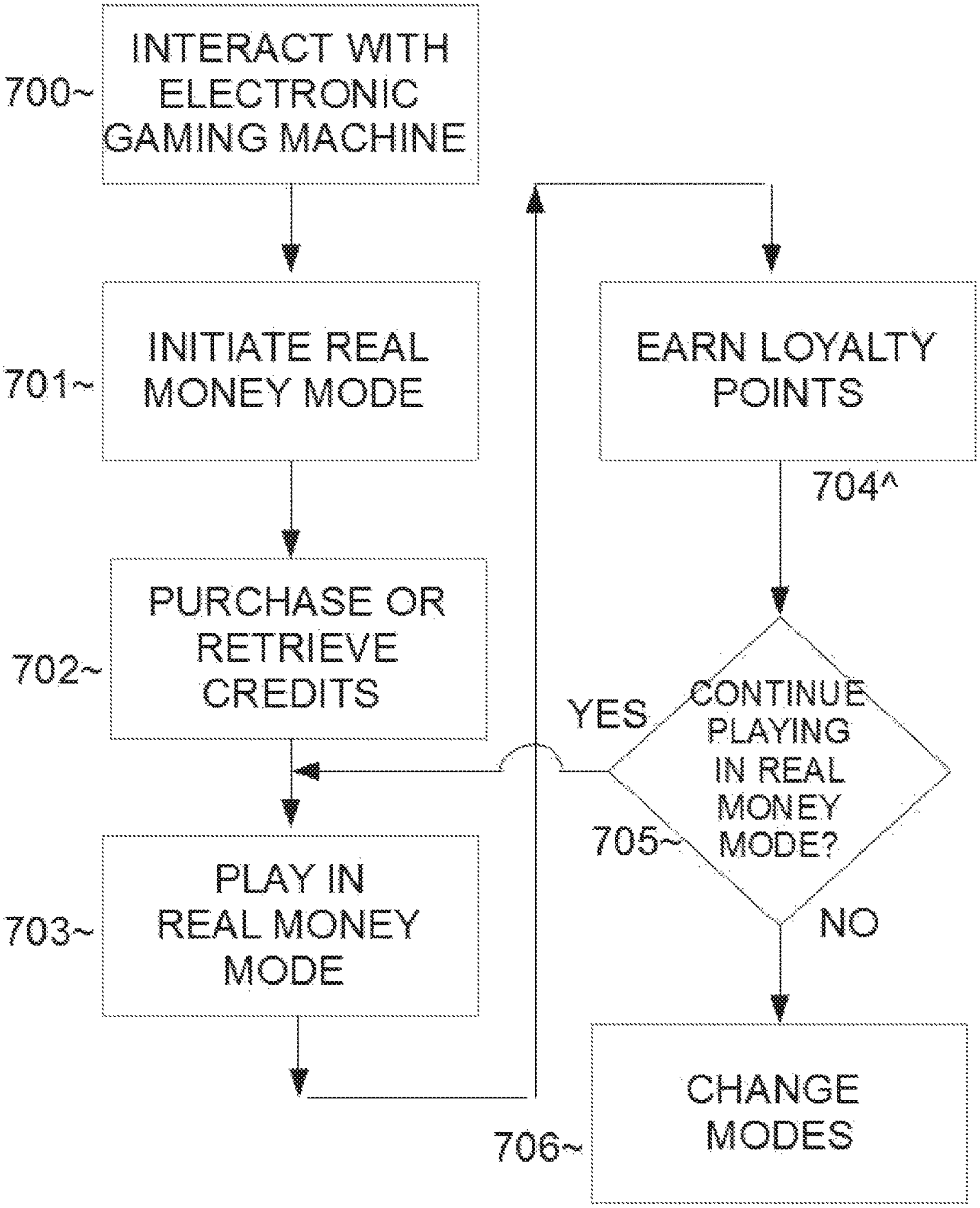
FIG. 7 is a flowchart illustrating an exemplary method of playing an electronic gaming machine on a physical casino floor in real money mode and earning loyalty points, according to an embodiment.

FIG. 7 is a flowchart illustrating an exemplary method of playing an electronic gaming machine on a physical casino floor in real money mode and earning loyalty points, according to an embodiment.

In operation 700 the player interacts with an electronic gaming machine (EGM).

From operation 700, the method proceeds to operation 701, wherein the player initiates real money mode on the EGM. This can be done by pressing a respective button on the EGM (virtual or real). If the EGM is already in the real money mode then there is no need for the player to change the mode.

From operation 701, the method proceeds to operation 702 wherein the player purchases or retrieves cash credits. The player can purchase cash credits by inserting a cash bill into a bill acceptor (validator) associated with the EGM, upon which the inserted cash is directly converted to an equivalent amount of cash credits. Alternatively, the player may fund the EGM by using the player's account with the casino which can store any cash credits the player has available to him (e.g., from an earlier purchase, win, etc.)

From operation 702, the method proceeds to operation 703, wherein the player plays in real money mode. The player wagers cash credits and wins cash credits (but does not win non-cash value credits). Cash credits are directly redeemable for cash (e.g., by cashing out to receive a cashless voucher which can be inserted into a ticket redemption machine on the casino floor which will dispense the cash value of the voucher), or cash credits can be saved on the player's account for later play. The game on the EGM can be any game the EGM offers, such as a slot game, video poker, video blackjack, etc. For example, the player pays $1 cash (in cash credits) to spin the reels on a slot game (which is deducted from the player's total cash credits), and if the resulting combination on the reels of the slot game are a predetermined winning combination then the player would win a respective amount of cash credits (added to the player's credit meter) otherwise the player would win 0 cash credits (the spin was a losing one). Each time the player places a wager, the wager amount is deducted from the player's credit meter (which displays the player's current amount of cash credits). If the player has zero cash credits left (or not enough to make the minimum required wager on the machine), then the player cannot continue to play without purchasing more cash credits (e.g., by inserting a cash bill into the bill acceptor/validator connected to the machine, etc.)

From operation 703, the method proceeds to operation 704 wherein the player can earn loyalty points for the player's play in operation 703. Earning loyalty points while playing in real money mode is optional on the part of the casino (it may or may not be offered to players). Loyalty points can be accumulated in the player's account (any account the player may have such as with the casino database or the online casino database). Loyalty points can be earned in a number of ways, such as in direct proportion to the amount wagered in the game. For example, if the player wagers $2 cash credits on a spin, the player can receive 2 loyalty points (or another ratio). Note that loyalty points are different from a quantity known as "comp points." While in some literature "loyalty points" would be considered the same as "comp points", as used herein these are two different quantities. Comp points are typically awarded to the player based on the amount the player has bet (for example, for every $100 the player wagered on a machine game using cash credits the player receives 1 comp point or any other ratio). Comp points can be redeemed from goods from the casino such as room, food, and beverage. However, loyalty points are a different quantity from comp point and can be used to redeem for tangible goods using an online web site (e.g., such as on a platform on FACEBOOK). The player earns loyalty points (synonymous with virtual points) playing a casual game (using non-cash value chips) at home using the player's computer. When the player plays an EGM at a live casino for real money (cash credits), the player can be given the additional incentive of also earning additional loyalty points as well (in addition to earning the standard amount of comp points the player would already earn). Thus, a player can earn loyalty points by playing at home (for non-cash value credits) or playing in a real casino for real money. Comp points are standard points that a casino would award real money players for playing machine games. The comp points would accumulate in the player's account in the casino database (the player would identify himself/herself to the EGM by inserting the player's comp card). Comp points can be exchanged for cash, redeemed for items at the casino such as room, food, and beverage. Comp points cannot be converted into non-cash value credits (and non-cash value credits cannot be converted into comp points). A player can typically view at any time how many comp points the player has. The amount of comp points is a separate quantity from the amount of loyalty points. The amount of comp points is specific to a particular casino group. For example, all of the MGM hotels (a casino group) would be linked to the same player database and the player's comp points would be available regardless of which machine at any MGM hotel the player is playing at. A casino group is a set casinos (one or more) which are owned by the same parent party (or at least have some relationship) so that comp points are shared across the different casinos/properties of the casino group. This means that each time a player plays at an EGM at any casino in a casino group, the amount of comp points is the same regardless of at which of the casinos in the casino group the player is located. Thus, if a player accumulates (earns) comp points at one casino, and then goes to a different casino in the same group, the player will have the same amount of accumulated comp points at the different casino in the same group. The comp points can be redeemed for products (such as free room, food, beverage, etc.) at any casino in the same casino group. This is because the EGM's at a casino group would typically share the same database. A different casino group has no record of how many comp points a player has at another casino group and thus maintains their own totals. Thus, a player could have 50 comp points at the MGM casino group (and thus all of the casinos in this group), 2000 comp points at the CAESAR's group (and thus all of the casinos in this group) and these totals are accumulated and redeemed separately. If the player goes to a different casino group that the player has never played at before, then typically the player would have zero comp points there. Thus, comp points are specific to each hotel group and not shared. This is in contrast to loyalty points, which can be stored on the online game database and thus can be maintained for all casinos at all groups (and also play online at home). In other words, there would be one quantity of loyalty points the player would accumulate and it would be the same across different hotel groups and casinos (thus, no matter where the player plays (any casino or at home using a personal computer/cell phone) the player would see the same amount of loyalty points accumulated). In other words, comp points are administered by the hotel group and loyalty points are administered by the online game database/server. The player can accumulate both comp points and loyalty points simultaneously. Comp points may also be converted into "cash back." For example, a player can earn 1 comp point for every $100 in cash wagers (cash credits) made, and the comp points can be converted into cash. For example, each comp point can be converted into a cash amount (e.g., each comp point can be converted into 10 cents). Comp points are described in U.S. Pat. No. 5,836,817 which is incorporated by reference herein in its entirety (in that document, "comp points" are referred to as "points"). Comp points typically would not be able to convert to loyalty points and loyalty points would not be able to convert to comp points. While comp points can be converted into cash, loyalty points cannot. Typically a player would not be able to purchase comp points or loyalty points.

From operation 704, the method proceeds to operation 705, which determines whether to continue playing in real money mode. The EGM would typically stay in the same mode it is in until changed by the player. Thus, if the player did not manually change the mode on the machine (by pressing a button, etc.) then the EGM should continue to play in real money mode and the method returns to operation 703.

In the player changes the mode of the machine (e.g., to casual mode) then the method proceeds to operation 706 which changes the mode of the machine. Cash credits cannot be converted to non-cash value credits and non-cash value credits cannot be converted into cash credits. When the mode of the machine is changed, the cash credits can be cashed out to the player (e.g., the player is given a cashless voucher for the amount of cash credits the player has) or the cash credits can be stored electronically in the player's account for later use. Then the method can proceed to operation 601 which continues the play in casual play mode.

Note that FIGS. 6-7 can be combined so a player can play in both real money mode and casual play mode on the same EGM and switch between modes whenever the player wishes to switch. Note that the games played in casual mode and real money mode would be the same and the payouts used by the games would also typically be the same (although they can be adjusted to accommodate for non-cash value credits in casual play mode and cash credits in real money mode). For example, the combination of 7-7-7-7-7 on a payline in a five reel slot game would be $100 (cash credits) for a $1 (cash credits) line bet in the real money mode and 100 non-cash value credits for a 1 non-cash value line bet in the casual play mode. Slot machine games (e.g., "Lucky 7's") that are offered for casual play in the physical casino may not be offered for casual play online, thus the only way a player can play certain games (titles) in the casual mode would be to come to the physical casino where they are located and play them in the casual mode. Note that the same games (e.g., a particular slot machine game such as "Lucky 7's") would be available for play both in the real money mode and the casual play mode. This way, a player can test out a slot machine game in the casual pay mode (which typically would be cheaper for the player) before playing it in the real money mode.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:

executing on at least one electronic processor, computer readable instructions stored on a non-transitory storage medium that perform:

enabling a player to purchase non-cash value credits using cash at an online casino, and enabling the player to earn loyalty points by playing the non-cash value credits on online games at the online casino by betting individual amounts of non-cash value credits on each individual game, an amount of the loyalty points earned is based on a number of the non-cash value credits played; identifying the player at an electronic gaming machine in a physical casino; determining a number of the loyalty points the player has, enabling the player to play a game on the electronic gaming machine by utilizing a cash deposit inserted into a bill validator associated with the electronic gaming machine; offering the player an option to augment the game on the electronic gaming machine into an augmented game by exchanging some of the loyalty points; and augmenting the game on the electronic gaming machine by receiving the some of the loyalty points from the player.

2. The method as recited in claim 1, further comprising, deducting loyalty points from the player's account on an online casino for each play of the game.

3. The method as recited in claim 1, wherein the game is augmented by providing the player a different reel mapping.

4. The method as recited in claim 1, wherein the game is augmented by providing the player an improved paytable.

5. The method as recited in claim 1, wherein the game is augmented by providing the player an enhanced bonus round.

6. The method as recited in claim 5, wherein the enhanced bonus round awards the player an additional multiplier at a final award of the bonus round.

7. The method as recited in claim 5, wherein the enhanced bonus round awards the player additional free spins in additional to a standard amount of free spins awarded in the bonus round.

8. The method as recited in claim 1, wherein the augmented game provides the player an opportunity to trigger a special bonus round that is not available in a non-augmented version of the game on the electronic gaming machine.

9. The method as recited in claim 1, wherein the augmented game provides the player non-cash prizes for certain combinations of symbols.

10. The method as recited in claim 9, wherein the non-cash prizes can be distributed to the player via an online game account used by the player at the online casino.

11. An apparatus, comprising:

one or more electronic processors, configured to read computer readable instructions stored on a non-transitory computer readable storage medium, the computer readable instructions configured to cause: enable a player to purchase non-cash value credits using cash at an online casino; enable the player to earn loyalty points by playing the non-cash value credits on online games at the online casino by betting individual amounts of non-cash value credits on each individual game, an amount of the loyalty points earned is based on a number of the non-cash value credits played; determine a number of the loyalty points the player has, the player utilizing an electronic gaming machine with a bill validator in a physical casino, enable the electronic gaming machine to offer the player an option to augment a game on the electronic gaming machine by exchanging some of the loyalty points, and receive the some of the loyalty points from the player.

12. The apparatus as recited in claim 11, wherein the computer readable instructions are further configured to deduct the some loyalty points from the player's account on an online casino for each play of the game.

13. The apparatus as recited in claim 11, wherein the computer readable instructions are further configured to augment the game on the electronic gaming machine by providing the player a different reel mapping.

14. The apparatus as recited in claim 11, wherein the computer readable instructions are further configured to augment the game on the electronic gaming machine by utilizing a different reel mapping.

15. The apparatus as recited in claim 11, wherein the computer readable instructions are further configured to augment the game on the electronic gaming machine by providing an improved paytable.

16. The apparatus as recited in claim 11, wherein the computer readable instructions are further configured to augment the game on the electronic gaming machine by providing an enhanced bonus round.

17. The apparatus as recited in claim 16, wherein the computer readable instructions are further configured such that the enhanced bonus round provides an additional multiplier.

18. The apparatus as recited in claim 16, wherein the computer readable instructions are further configured to such that the enhanced bonus round awards the player additional free spins in addition to a standard amount of free spins awarded in the bonus round.

19. The apparatus as recited in claim 11, wherein the computer readable instructions are further configured to provide the player an opportunity to trigger a special bonus round that is not available in a non-augmented version of the game on the electronic gamine machine.

20. The apparatus as recited in claim 11, wherein the computer readable instructions are further configured such that the augmented game provides the player non-cash prizes for certain combinations of symbols.

* * * * *